US012084100B2

(12) United States Patent
Wang et al.

(10) Patent No.: US 12,084,100 B2
(45) Date of Patent: Sep. 10, 2024

(54) RETRACTABLE PULL ROD ASSEMBLY FOR ROLLING TOOLBOX AND THE LIKE

(71) Applicant: Meridian International Co., Ltd, Shanghai (CN)

(72) Inventors: Qiang Wang, Shanghai (CN); Shujun Cai, Shanghai (CN)

(73) Assignee: Meridian International Co., Ltd, Shanghai (CN)

( * ) Notice: Subject to any disclaimer, the term of this patent is extended or adjusted under 35 U.S.C. 154(b) by 276 days.

(21) Appl. No.: 17/729,565

(22) Filed: Apr. 26, 2022

(65) Prior Publication Data

US 2023/0026436 A1 Jan. 26, 2023

(30) Foreign Application Priority Data

Jul. 15, 2021 (CN) .......................... 202121618345.5

(51) Int. Cl.
*B62B 3/02* (2006.01)
*B25H 3/02* (2006.01)

(52) U.S. Cl.
CPC ........ *B62B 3/02* (2013.01); *B25H 3/02* (2013.01)

(58) Field of Classification Search
CPC .... B25H 3/02; B62B 3/02; B62B 5/06; B62B 2202/12; B62B 2202/48
USPC ..................................... 206/372–373; 280/39
See application file for complete search history.

(56) References Cited

U.S. PATENT DOCUMENTS

| 4,659,096 A * | 4/1987 | Leimgruber | B62B 3/02 280/655.1 |
| 7,784,816 B2 * | 8/2010 | Jian | B62B 3/02 280/38 |
| 8,528,931 B2 * | 9/2013 | Loureiro Benimeli | B62B 1/12 280/DIG. 3 |
| 8,979,098 B2 * | 3/2015 | Wang | B62B 3/022 280/651 |
| 2008/0181589 A1 * | 7/2008 | Dean | B25H 3/02 206/372 |

* cited by examiner

*Primary Examiner* — Bryon P Gehman
(74) *Attorney, Agent, or Firm* — Eversheds Sutherland (57) ABSTRACT

The application discloses a horizontal rod, a retractable pull rod assembly and a toolbox, the retractable pull rod assembly includes two opposing connecting rods, a horizontal rod snapped to the ends of the two connecting rods and a pull rod retractable in the connecting rods, the horizontal rod includes a horizontal rod body and a button member, a gear member, a drive member and an elastic member provided in the horizontal rod body. The button member, the gear member and the driving member are connected to each other by transmission, and the button member can be driven by the gear member to contract in the body of the horizontal rod, and the driving member can be automatically returned by the elastic member, so that the connecting rod and the pull rod can be unlocked and locked with each other. This application can be retractable pull rod assembly structure is simple, use more smoothly, enhance the using feel.

18 Claims, 10 Drawing Sheets

RETRACTABLE PULL ROD ASSEMBLY FOR ROLLING TOOLBOX AND THE LIKE

CROSS-REFERENCE TO RELATED APPLICATIONS

The present application claims the benefit of Chinese Patent Application No. 202121618345.5 filed Jul. 15, 2021 which is incorporated herein by reference. The present application also incorporates by reference co-pending non-provisional application titled, A Removable Pull Rod Assembly and Rolling Toolbox and the like filed concurrently herewith.

TECHNICAL FIELD

The present application relates to the technical field of toolboxes, and in particular to a horizontal rod, a retractable trolley assembly and a toolbox.

BACKGROUND INFORMATION

Tool box is a container for storing tools and various household sundries, which can be used for various purposes such as production, household, maintenance and fishing, etc. It is widely used. Toolboxes include mobile toolboxes. The mobile toolboxes are driven to move by telescopic ties. However, the existing telescopic trolley structure is complex and the telescopic is not smooth, which reduces the user's using feel.

Accordingly, there is a need for a retractable pull rod assembly structure that is simple to use with a smooth operation and enhanced ergonomic fee.

SUMMARY

In accordance with one aspect of the present invention, disclosed is a horizontal rod, retractable trolley assembly and toolbox to solve the existing retractable trolley structure is complex, retractable is not smooth, reducing the user's using feel.

To solve these technical problems, the application proposes a retractable pull rod assembly, including two opposite connecting rods, the rods set in the ends of the two connecting rods and a pull rod that can be retracted in the connecting rods, the cross rod includes a cross rod body and a button member, a gear member, a driving member and an elastic member set in the cross rod body. The button member, the gear member and the driving member are connected to each other by transmission, the button member can drive the driving member to shrink in the cross rod body through the gear member, and the driving member can automatically return to position through the elastic member so that the connecting rod and the pull rod can be unlocked and locked to each other.

Wherein, both ends of the button member are provided with a button rack, and the button rack engages with the gear of the gear member.

The cross rod includes a vertical projection and a vertical guide groove. The vertical projection is formed on the guide column and the vertical guide groove is formed on the button member; the horizontal bar body is also formed with a limit bar, which is located between the horizontal bar body and the drive member.

Wherein, the gear member is a drive gear, and the drive gear is located between the button member and the drive member, and is mutually gear-engaged with the button member and the drive member.

Wherein, the driving member is a driving block, and a driving rack is provided at the end of the driving block toward the horizontal rod, and a protruding part is provided at the end of the driving block, and the protruding part can protrude from the body of the horizontal rod; the protruding part is provided with a limiting part, and the limiting part is always located in the body of the horizontal rod.

Wherein, the connecting rod is provided with a connecting rod notch, the pull rod is provided with a pull rod notch, and the cross rod is provided with a cross rod notch; when the button member is pressed, the protruding part is contracted inside the body of the cross rod, and the connecting rod and the pull rod are unlocked; when the button member is released from being pressed, the protruding part extends in the body of the cross rod and is located inside the connecting rod notch, the pull rod notch, and the cross rod notch, and the connecting rod and the pull rod are locked.

Wherein, the horizontal guide structure includes a horizontal projection and a horizontal guide groove, the horizontal projection is formed on the connecting column and the horizontal guide groove is formed on the driving member.

Wherein, the elastic member is a spring, and the two ends of the spring are interconnected with the driving member; when the driving member is contracted in the body of the horizontal rod, the spring is compressed by force.

Wherein, one end of the connecting rod is provided with a snap, and a slot is opened on the horizontal rod, and the snap is stuck in the slot; the pull rod is provided with a limit post, and the end of the limit post protrudes from the pull rod near the horizontal rod, and the limit slot is provided on the horizontal rod, and the limit post and the limit slot can be interlocked.

To solve the above technical problems, the present application proposes a toolbox, including a toolbox body and a retractable trolley assembly, the retractable trolley assembly is provided on the toolbox body, and the retractable trolley assembly is the retractable trolley assembly described above.

To solve the above technical problems, this application proposes a horizontal rod. The horizontal rod includes a horizontal rod body and a button member, a gear member, a drive member and an elastic member set in the horizontal rod body. The button member, the gear member and the drive member are connected to each other by transmission, the button member can drive the drive member to shrink in the horizontal rod body through the gear member, and the drive member can automatically return to the position through the elastic member.

The beneficial effect of the present application is: differing from the prior art, the present application provides a retractable pull rod assembly. The button member, gear member and drive member are connected to each other by transmission, and the button member can drive the drive member to shrink in the body of the horizontal rod through the gear member; the two ends of the elastic member are connected to the drive member, and the drive member can be automatically homed through the elastic member, so that the connecting rod and pull rod can be unlocked and locked with each other. Through the above-mentioned way, it not only realizes the unlocking and locking of the pull rod with simple structure, but also makes the unlocking and locking process of the pull rod smoother, enhances the smoothness of the retractable pull rod assembly, and greatly improves the user's hand feeling.

BRIEF DESCRIPTION OF THE DRAWINGS

In order to illustrate the technical solutions in the embodiments of the present application more clearly, the following is a brief description of the accompanying drawings to be used in the description of the embodiments. It is obvious that the accompanying drawings in the following description are only some of the embodiments of the present application, and other accompanying drawings can be obtained from these drawings without any creative work for a person of ordinary skill in the art, among which.

DETAILED DESCRIPTION OF THE PREFERRED EMBODIMENTS

The technical solutions in the embodiments of the present invention will be clearly and completely described below in conjunction with the accompanying drawings of the illustrated embodiments of the present invention, and it is clear that the described embodiments are only a part of the embodiments of the present invention, and not all of them. Based on the embodiments in the present invention, all other embodiments obtained by a person of ordinary skill in the art without making creative labor fall within the scope of protection of the present invention.

It should be noted that if there is a directional indication (such as up, down, left, right, forward, back . . . ) involved in an embodiment of the present invention, the directional indication is only used to explain the relative position relationship, movement, etc. between the components in a particular embodiment (as shown in the attached figure), and if that particular embodiment is changed, the directional indication is also.

In addition, if there is a description involving "first", "second", etc. in an embodiment of the present invention, the description of "first", "second", etc. is used for descriptive purposes only and is not to be understood as indicating or implying its relative importance or implicitly specifying the number of technical features indicated. Thus, features qualified with "first" and "second" may explicitly or implicitly include at least one such feature. In addition, the technical solutions of the various embodiments may be combined with each other based on the knowledge of a person of ordinary skill in the art.

The following is a detailed description of a horizontal rod, a retractable trolley assembly and a toolbox provided by the present invention in conjunction with an embodiment.

Figure 1:
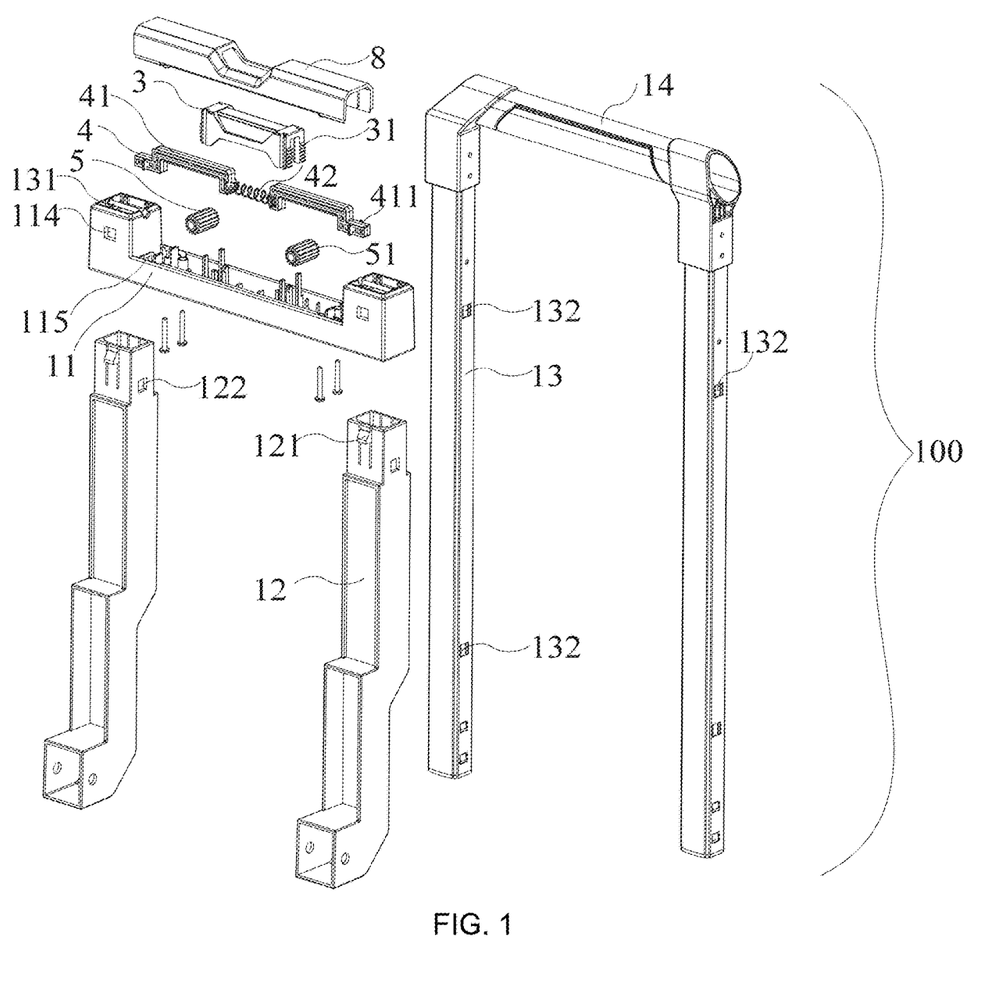
FIG. 1 is an exploded schematic diagram of the retractable pull rod assembly of FIG. 5.
Figure 2:
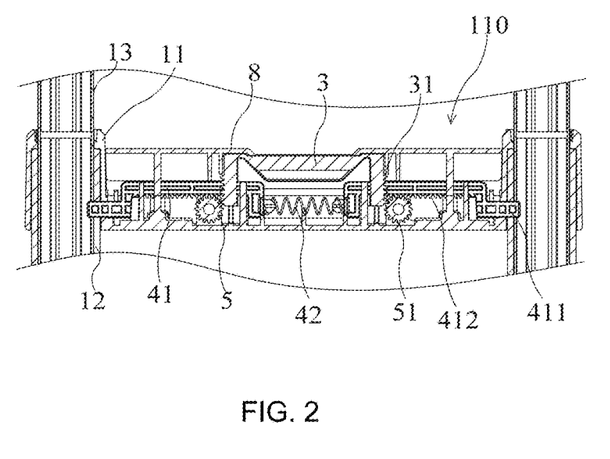
FIG. 2 is a partial cross-sectional view of the retractable pull rod assembly in the locked state.
Figure 3:
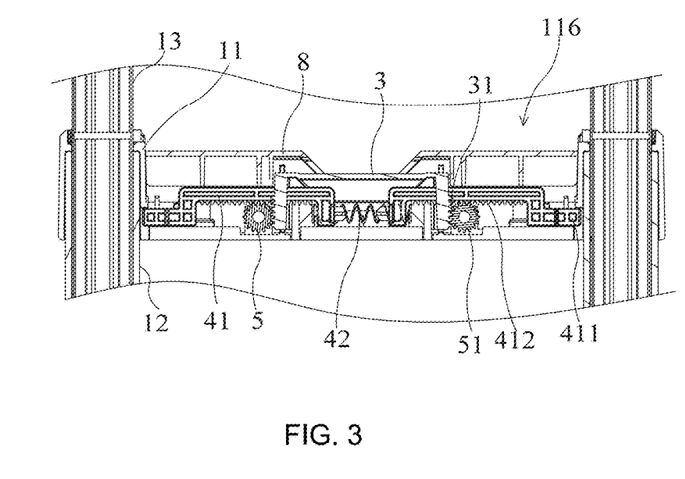
FIG. 3 is a partial cross-sectional view of the retractable pull rod assembly in the unlocked state.

Referring to FIGS. 1-3, shown is an exploded schematic view of the retractable pull rod assembly 100 of the present application, a partial cross-sectional view of the retractable pull rod assembly 100 of the present application in the locked state, and a partial cross-sectional view of the retractable pull rod assembly 100 of the present application in the unlocked state.

Figure 11:
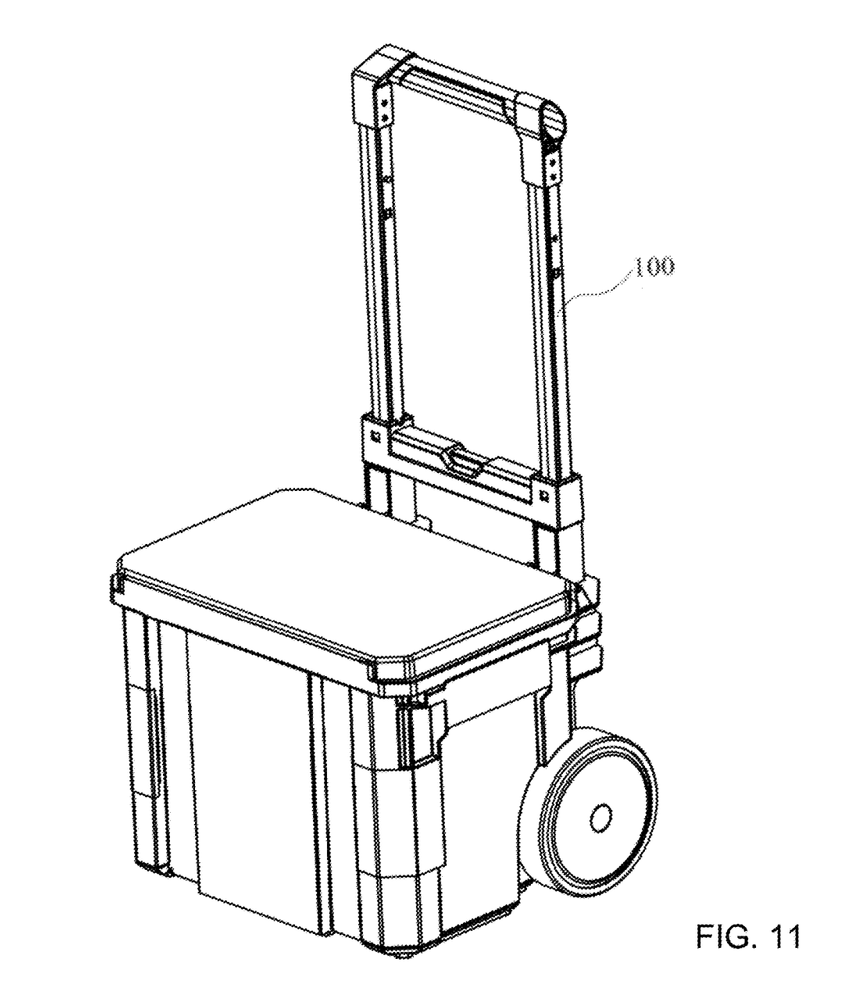
FIG. 11 shows a tool box with a retractable pull rod assembly according to this disclosure.

Disclosed, as shown in FIG. 11, is a retractable pull rod assembly 100 connected to a tool box according to this disclosure. In one embodiment, the retractable pull rod assembly 100 includes a horizontal rod 11, two connecting rods 12 and two pull rods 13. The two connecting rods 12 are set opposite each other and are used to connect the tool box (see FIG. 11) and the wheel (not shown on the figure), etc. The two ends of the horizontal rod 11 are set at the end positions of the two connecting rods 12 to realize the connection between the horizontal rods 11 and the two connecting rods 12. The two pull rods 13 are set relative to each other and are correspondingly retractable within the connecting rods 12, i.e. the pull rods 13 can be pulled out or retracted relative to the connecting rods 12. When the toolbox needs to be moved, the pull rod 13 is pulled out from the connecting rod 12 to grow the length of the pull rod 13 so that the user can move the toolbox. When there is no need to move the toolbox, the pull rod 13 is partially retracted into the pull rod 13 to reduce the overall height as well as the size of the toolbox.

Among them, the horizontal rod 11 includes a horizontal rod body (not shown on the figure). A button member 3, a drive member 4, a gear member 5 and an elastic member 42 are provided in a horizontal rod body 116. The button member 3, the drive member 4 and the gear member 5 are connected with each other in a transmitting relationship. The button member 3 can drive the drive member 4 to contract in the horizontal rod body 116 through the gear member 5 to realize the unlocking of the connecting rod 12 and the pull rod 13. The drive member 4 can automatically return through the elastic member 42 to realize the locking between the connecting rod 12 and the pull rod 13.

In order to clearly describe the specific operation process of the retractable pull rod assembly 100, the first direction and the second direction are defined, wherein the first direction is vertically oriented and the second direction is horizontally oriented. When the user presses the button member 3, the button member slides 3 along the first direction toward the inside of the horizontal rod 11. The button member 3 is connected to the gear members 5, and the button member 3 when pressed downward, in the first direction drives the two gear members 5 to rotate counterclockwise; at the same time, the gear member 5 is connected to the drive member 4, and the gear member 5 drives the two drive members 4 to approach each other along the second direction, so that the two drive members 4 contract in the horizontal rod body 116, and then realize the unlocking of the connecting rod 12 and the pull rod 13, in which the pull rod 13 is in a pull-out or retractable state, i.e., the telescopic pull rod assembly is in an unlocked state. At the same time, in the process of the two driving members 4 approaching each other, the elastic member 42 is in a compressed state, as shown in the FIG. 3. In this regard, elastic member 42 can be offset below the button member 3 to automatically return the pair of drive members 4 to the locked position.

When the user lifts the pressure on the button member 3, the elastic member 42 returns to its original state and automatically returns to its original position. In this process, the elastic member 42 pushes the two driving members 4 away from each other in the second direction to make the two driving members 4 end up at the surface position of the relatively set pull rod 13 respectively until the drive member 4 is inserted into a pull rod notch 132 of the pull rod 13 to achieve mutual locking between the connecting rod 12 and the pull rod 13. At the same time, in the process of pushing the two drive members 4 away from each other, the drive member 4 drives the gear member 5 to rotate in the clockwise direction, and the gear member 5 drives the button member 3 to return to the position along the first direction away from the horizontal rod 11. Rod 13 is in the locked state, i.e., the telescopic pull rod assembly is in the locked state, as shown in the FIG. 2

As a result, the interplay between the button member 3, the drive member 4, the gear member 5, and the elastic member 42 not only realizes the unlocking and locking of the pull rod 13, but also with a simple structure. At the same time, the button member 3 and the drive member 4 are driven by the gear member 5, i.e. the gear member 5 engages between the button member 3 and the drive member 4, which makes the button member 3 slide and the two drive members 4 move more smoothly, thus making the unlocking and locking process of the pull rod 13 smoother, thus enhancing the smoothness of the retractable pull rod assembly 100 and greatly improving the user's feel.

The above-mentioned button member 3, drive member 4, and gear member 5 are all set inside the horizontal rod 11, making the internal structure more compact, and the horizontal rod 11 can also provide a translation track for the drive member 4, so that the drive member 4 can move horizontally reciprocally in the second direction and avoid its motion to be shifted. Wherein the first direction and the second direction can be set both vertically. Of course, in other embodiments, the first direction and the second direction may not be set vertically, without limitation here. For example, the first direction may be horizontally and the second direction may be vertical.

Figure 4:
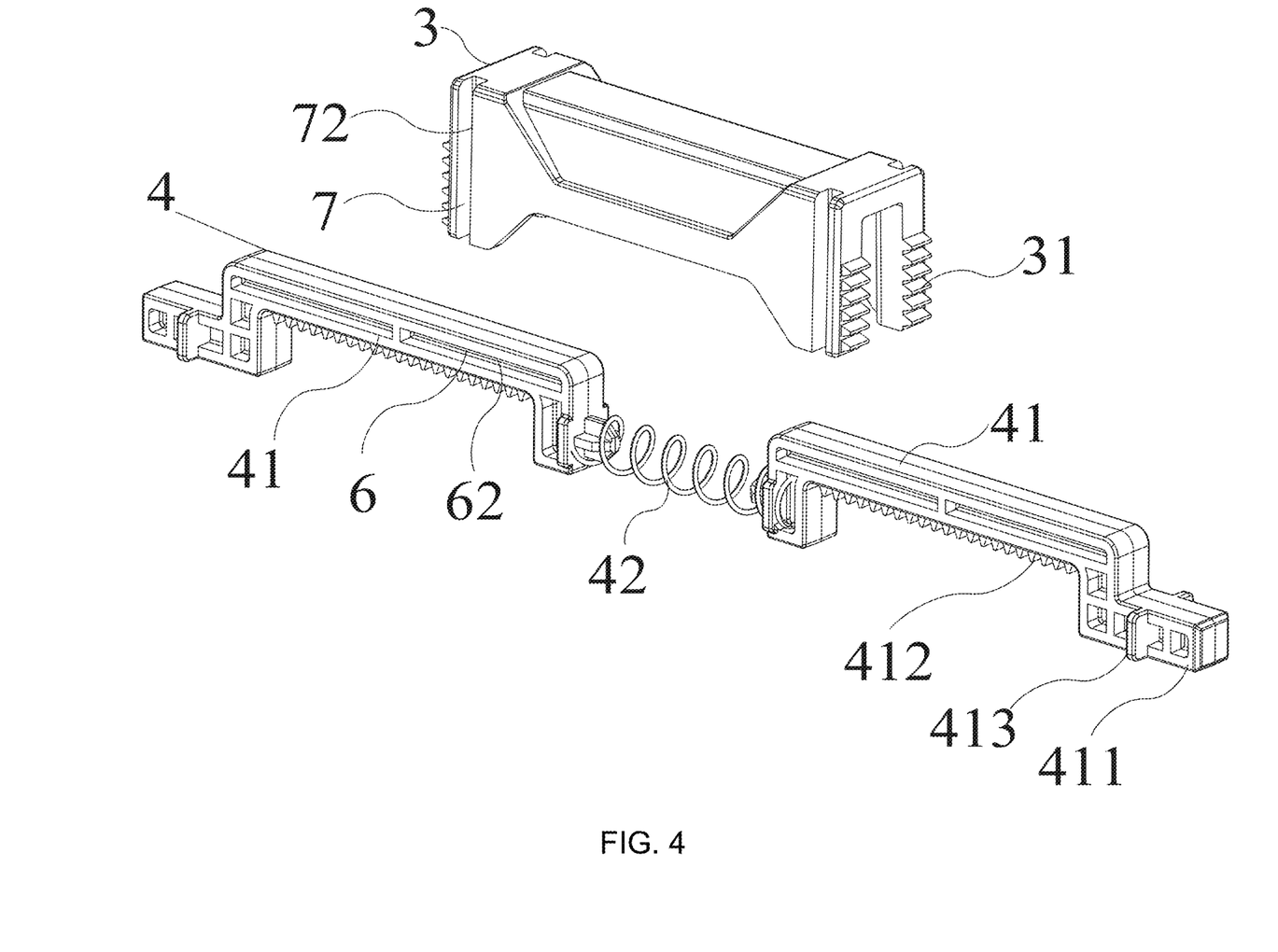
FIG. 4 is a schematic representation of the local explosion shown in FIG. 1

Specifically, refer to the FIG. 4, which is a partial exploded schematic diagram shown in the FIG. 1. Combined with the FIG. 1 to the FIG. 3, both ends of the button member 3 are provided with a button rack 31, and the button rack 31 is connected with the teeth of the gear member 5, which makes the button member 3 move more smoothly and enhances the smoothness of the retractable pull rod assembly 100, greatly improving the user's hand feeling.

The above-mentioned button rack 31 can extend in the same direction as the movement of the button member 3, e.g., the button rack 31 can extend in the first direction. The button rack 31 can be integrally molded with the button member 3, or the button rack 31 can be set on the connection plate (not shown on the drawing), which is set on the two ends of the button member 3, without limitation here.

Figure 5:
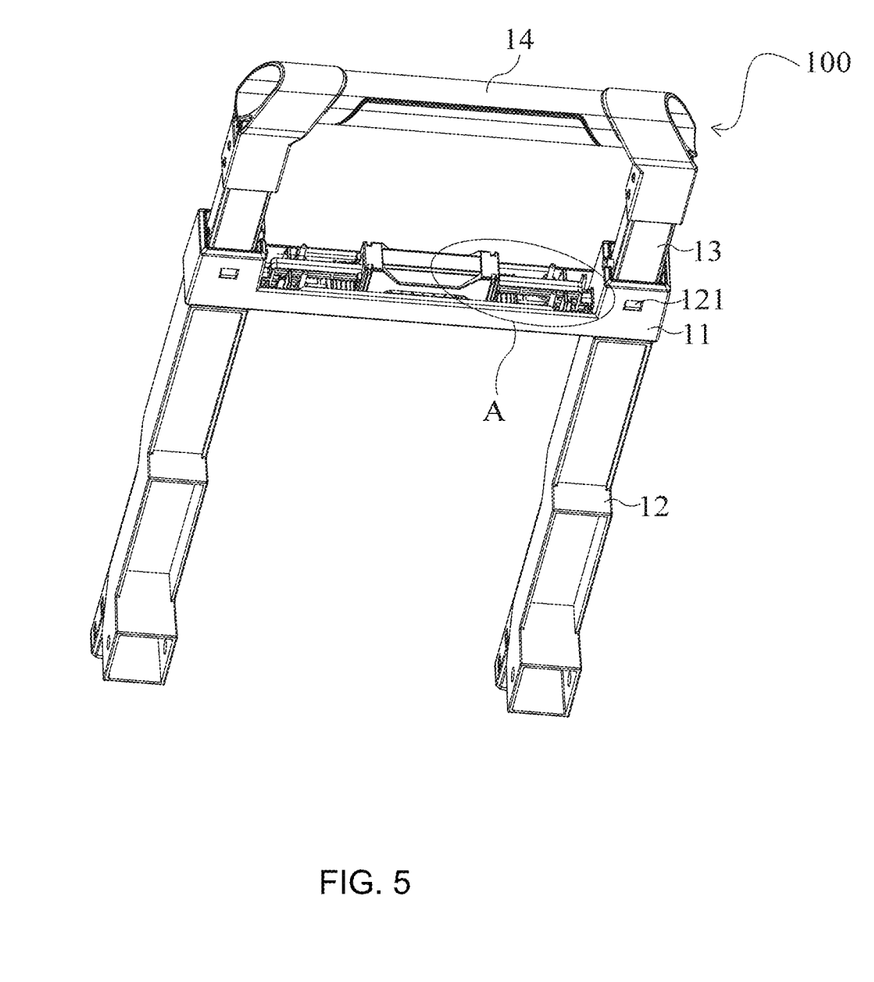
FIG. 5 is a schematic diagram of a retractable pull rod assembly according to this disclosure.
Figure 6:
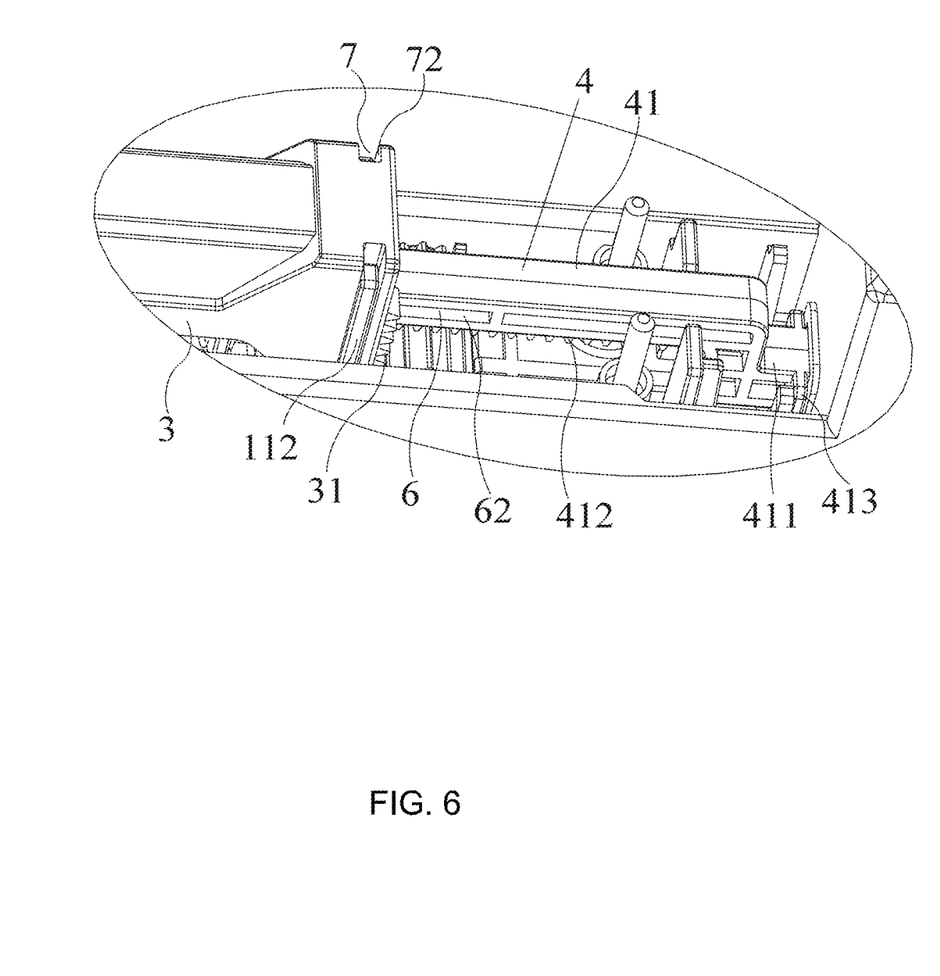
FIG. 6 is an enlarged view of part A of FIG. 5.

Referring to the FIG. 5 and the FIG. 6, FIG. 5 is a schematic diagram of the structure of the retractable pull rod assembly 100 of the present application; FIG. 6 is an enlarged view of part A of the FIG. 5. In one embodiment, in conjunction with the FIG. 1, a vertical guiding structure 7 is provided inside the horizontal bar body 116, and the vertical guiding structure 7 acts as a guide to limit the sliding movement of the button member 3 in the first direction and prevent it from shifting, which improves the smoothness of the button member 3 pressing and thus enhances the smoothness of the movement of the retractable pull rod assembly 100 and improves the user experience. The above vertical guiding structure 7 can be any structure, as long as it can limit the sliding motion of the button member 3 in the first direction, and its specific structure is not limited.

Figure 9:
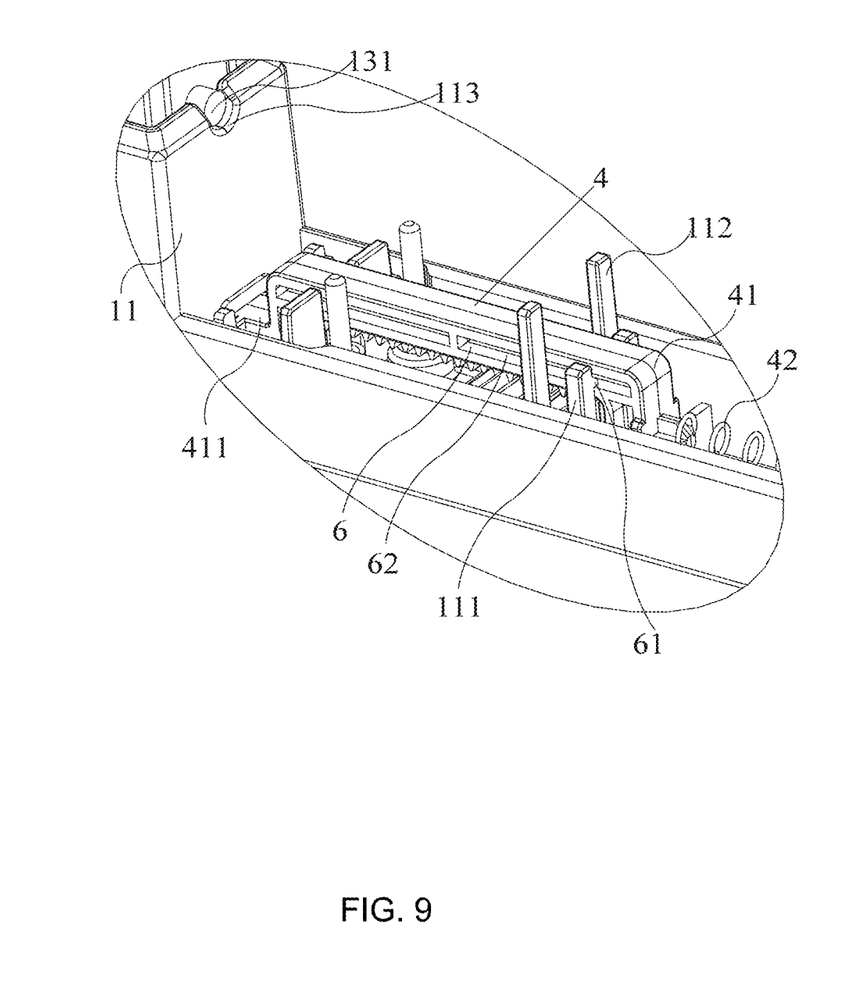
FIG. 9 is an enlarged view of part B of the FIG. 8

Specifically, the vertical guiding structure 7 includes a vertical projection (not shown in the figure) and a vertical guiding groove 72, and the vertical projection and the vertical guiding groove 72 cooperate with each other to provide guidance for the button member 3 to move in the first direction. Therein, a guide column 112, as shown more clearly in FIG. 9, is provided in the body of the horizontal rod 11, and the guide column 112 is provided vertically in the first direction.

In one specific embodiment, the vertical projection is formed on the guiding column 112 and the vertical guiding groove 72 is formed on the button member 3. During the movement and sliding of the button member 3 relative to the horizontal rod 11, the vertical projection slides in the vertical guiding groove 72 in the first direction to limit the movement of the button member 3 in the first direction and prevent it from shifting. For example, in this embodiment, there are two depressed vertical guiding groove 72 on each side of the button member 3, and four guiding columns 112 are set inside the body of the horizontal rod 11, and the vertical projections are located in the corresponding vertical guiding groove 72 to limit the upward and downward sliding motion of the button member 3 in the first direction.

As in one other specific embodiment, the vertical projection is formed on the button member 3 and the vertical guiding structure 7 is formed on the guiding column 112. During the sliding of the button member 3 relative to the horizontal rod 11 movement, the vertical projection slides in the vertical guiding groove 72 in the first direction to limit the movement of the button member 3 in the first direction and prevent it from deflecting.

Figure 7:
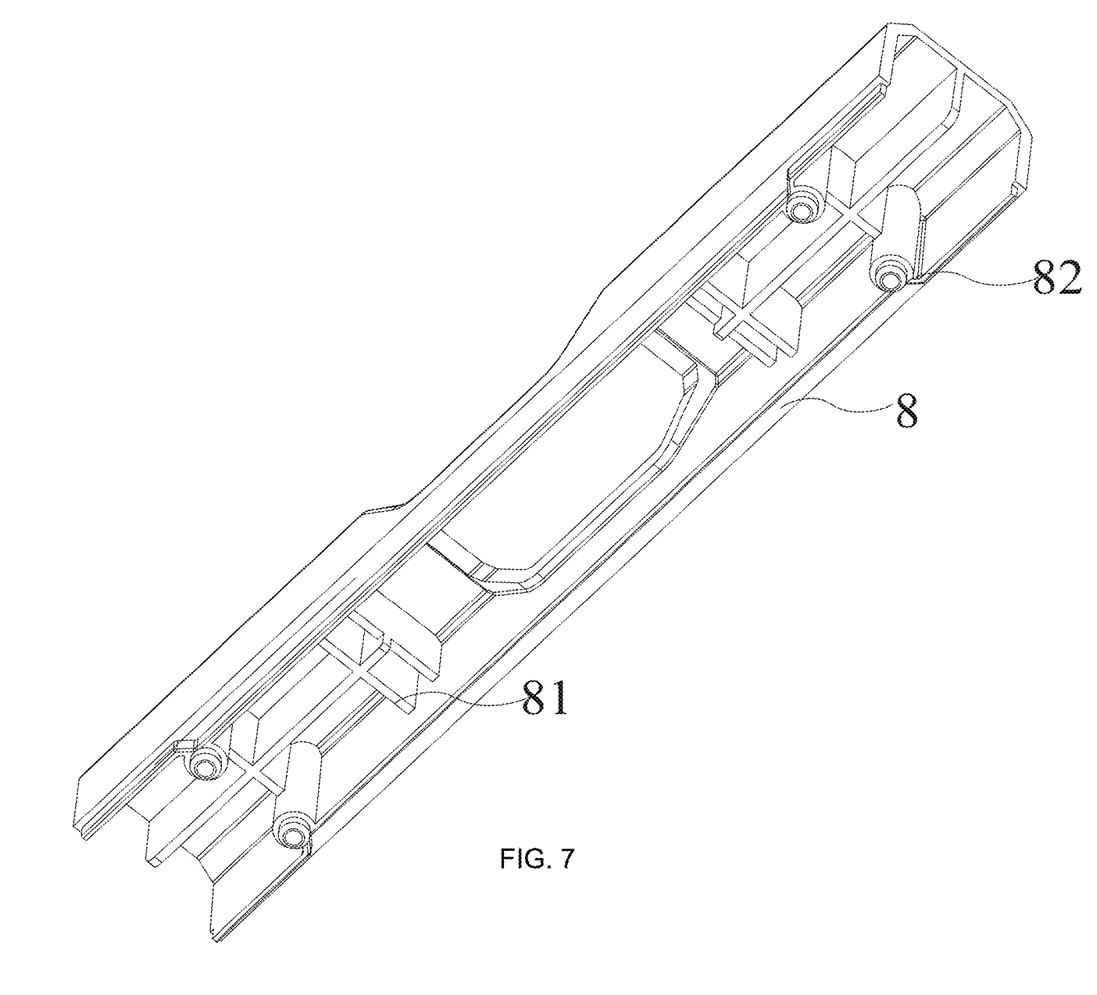
FIG. 7 is a schematic diagram of the structure of the cover plate.

Referring to FIG. 7, shown is a schematic diagram of the structure of the cover plate of the present application. In one embodiment, in conjunction with the FIG. 1, a limit bar 81 is formed within the body of the horizontal rod, wherein the limit bar 81 is located in the area between the body of the horizontal rod 11 and the drive member 4, and the limit bar 81 is capable of limiting the drive member 4 from buckling during translation in the second direction, thereby maintaining the horizontal reciprocal movement of the drive member 4 in the second direction.

Specifically, the horizontal rod 11 also includes a cover plate 8, which is provided above the horizontal rod 11 to form the above-mentioned horizontal rod body 116, wherein limit tendons are provided in the cover plate 8. The limit tendons in in the cover plate 8 and the horizontal rod 11 cooperate with each other to further ensure that the drive member 4 does not buckle or skew during the translation in the second direction, and thus keep the drive member 4 in a smooth horizontal reciprocating motion.

The above-mentioned cover plate 8 is removably attached to the horizontal rod 11, so that the cover plate 8 is stably attached to the horizontal rod 11. A number of screw posts 82 are formed inside the cover plate 8, and set screws are threaded through the horizontal rod 11 to connect the screw posts 82 on the cover plate 8 to enable the cover plate 8 to be securely mounted on the horizontal rod 11 to protect the internal members of the horizontal rod 11 from being able to move reliably within it.

The button member 3 is inserted in the cover plate 8 and slides in the first direction with respect to the horizontal rod 11. The cover plate 8 not only protects the internal structure of the horizontal rod 11, such as the button members 3, drive members 4, and gear members 5, but also provides an aesthetic effect and limits the distance that the button member 3 can be moved upward in the first direction away from the horizontal rod 11.

Referring back to FIGS. 1-4, in one embodiment, the gear member 5 is a drive gear 51, and the drive gear 51 is located between the button member 3 and the drive member 4, wherein the drive gear 51 respectively engages the button member 3 and the drive member 4 with each other. By engaging the drive gear 51 with the button member 3 and the drive member 4 respectively, the button member 3 slides and the drive member 4 translates more smoothly, thus making the movement of the retractable pull rod assembly 100 more smooth; moreover, it makes the unlocking and locking movement of the pull rod 13 more reliable, more direct and better feel.

In one embodiment, the drive member 4 is a drive block 41 with a drive rack 412 provided on the end face of the drive block 41 toward the horizontal rod 11, where the drive rack 412 can be integrally molded with the drive block 41 or the drive rack 412 is provided on a connection plate (not shown in the FIG. 1), which is provided on the end face of the drive block 41 toward the horizontal rod 11, without limitation here.

For example, when both ends of the button member 3 are provided with a button rack 31 and the gear member 5 is a drive gear 51, the drive gear 51 is engaged with the button rack 31 and the drive gear 51, respectively. By pressing down the button member 3 along the first direction, the button rack 31 on the button member 3 drives the two drive gears 51 to rotate counter-clockwise; during the rotation of the two drive gears 51, the drive gears 51 drive the drive rack 412 to move, making the drive block 41 move toward the elastic member 42, thus making the two drive blocks 41 move toward each other along the second direction and compress the elastic member 42 at the same time. At this time, the pull rod is 13 in the unlocked state, the pull rod 13 can be pulled out or retracted, that is, the telescopic pull rod assembly 100 is in the unlocked state.

After the user releases the button member 3, the elastic member 42 returns to its original state, and the elastic member 42 pushes the two driving blocks 41 away from each other at the same time. In addition, during the process of driving the driving blocks 41 away from each other, both driving rack 412 reverse to drive the drive gears 51 to rotate clockwise, and the drive gears 51 drive the button rack 31 to move, making the button member 3 return to its position along the first direction away from the horizontal rod 11. When the drive block 41 touches the surface of the pull rod 13 and is held against it, the gear member 5 stops rotating. When the pull rod 13 is pulled, the drive block 41 can be inserted into a pull rod notch 132 of the pull rod 13, at this time the pull rod 13 is in a locked state, that is, the telescopic pull rod assembly 100 is in a locked state.

As a result, the above-mentioned drive gear 51 and button rack 31 engagement connection and drive gear 51 and drive rack 412 engagement connection not only make the button member 3 sliding and the two drive blocks 41 translating more smoothly, thus making the retractable pull rod assembly 100 movement more smooth; but also make the pull rod 13 unlocking and locking movement more reliable, more direct action, and better feel.

In addition, the above drive block 41 is provided with a protruding part 411 at the end, and when the retractable pull rod 13 assembly is in the locked state, the protruding part 411 can protrude from the horizontal rod 11 body to lock with the pull rod 13, i.e., the pull rod 13 is fixed with the connecting rod 12. When the retractable pull rod 13 assembly is in the unlocked state, the protruding part 411 is located inside the horizontal rod 11 body and unlocked with the pull rod 13.

Referring back to the FIG. 3 and FIG. 4, further, the protruding part 411 is provided with a limit part 413, which is always located in the internal space of the horizontal rod body 116 regardless of whether the retractable pull rod assembly 100 is in a locked or unlocked state, which limit part 413 is capable of limiting excessive protrusion of the protruding part 411 of the drive block 41. The limit part 413 is attached to the interior of the horizontal rod 11 during attachment of the drive block 41 to the pull rod 13 and is used to prevent the protruding part 411 from moving excessively into the interior of the pull rod 13.

Figure 10:
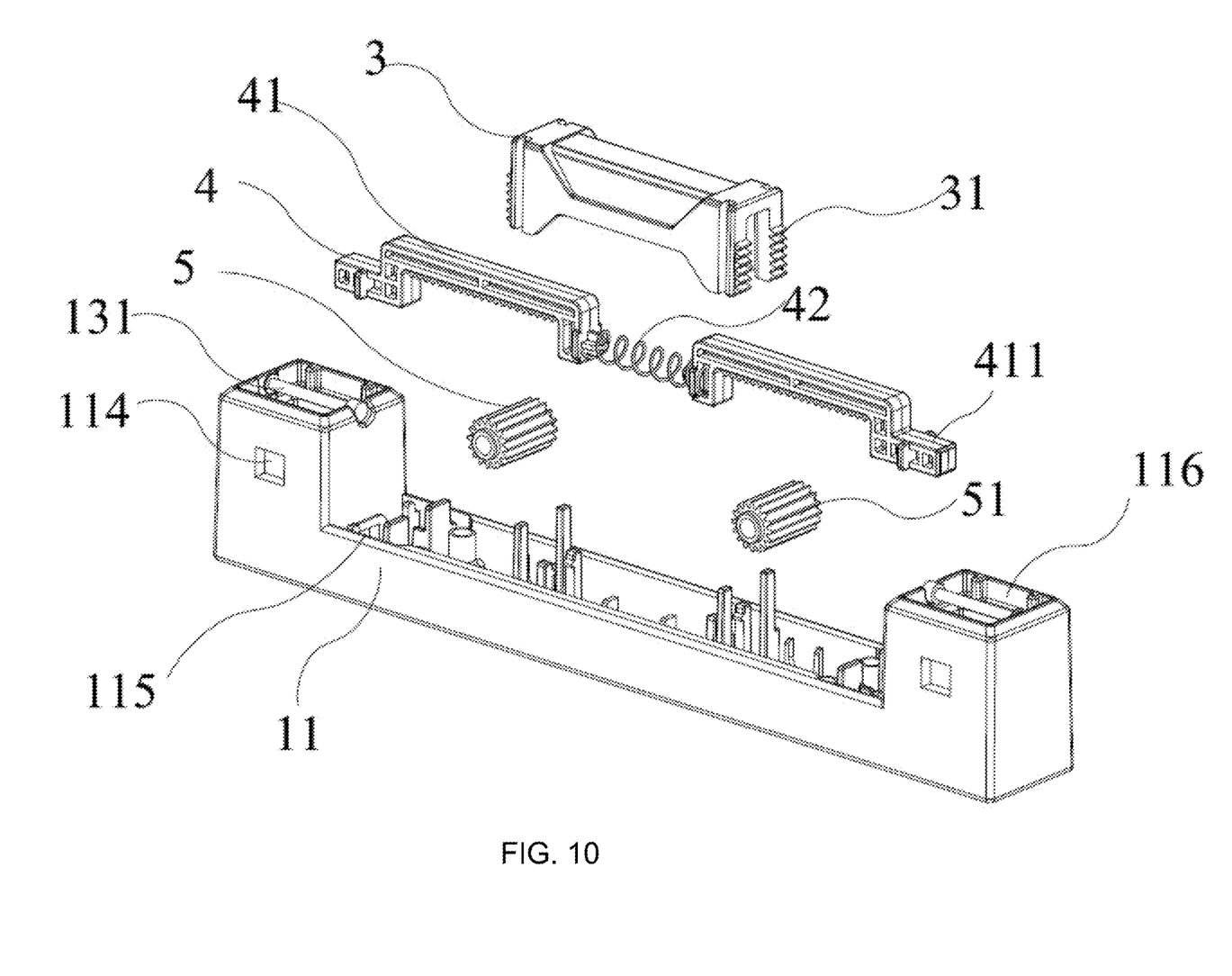
FIG. 10 is a schematic diagram of the structure of the horizontal rod.

In one embodiment, referring back to the FIG. 1-FIG. 3, the above-mentioned connecting rod 12 is provided with a connecting rod notch 122, the pull rod 13 is provided with a pull rod notch 132, and the horizontal rod 11 is provided with a horizontal rod notch 115 (see FIG. 10). When the button member 3 is pressed, the protruding part 411 of the drive block 41 is contracted from the pull rod notch 132, the connecting rod notch 122 and the horizontal rod notch 115 in turn into the body of the horizontal rod 11. When the button member 3 is released, the protruding part 411 extends into the body of the horizontal rod 11 and is located in the horizontal rod notch 115, the connecting rod notch 122 and the pull rod notch 132 in turn, so that the protruding part 411 on the driving block 41 is quickly inserted into the pull rod notch 132, thus realizing interlocking between the connecting rod 12 and the rod 13.

Please refer back to the FIGS. 1-3, the above two pull rods 13 can be provided between at least two sets of pull rod notches 132, where the pull rod notches 132 can be one group, two groups or more groups. When the pull rod notch 132 can be a plurality of groups, the pull rod 13 according to the position of the pull rod notch 132 can be extended to different lengths, so that users can easily adjust the extension length of the pull rod 13 according to different use environments, so as to facilitate the use of users. If there are two sets of pull rod notches 132 between two pull rods 13, the pull rod 13 is locked after pulling out a certain distance and the pull rod 13 retracts a certain distance is related to the distance between the two sets of pull rod notches 132. The above distance between adjacent pull rod notches 132 is not limited and can be determined according to the actual situation.

The protrusion part 411 in the drive block 41 described above snaps into the pull rod 13. The limit part 413 stops at the horizontal rod notch 115 of the horizontal rod 11 to prevent the protrusion part 411 from moving excessively into the interior of the pull rod 13 through the pull rod notch 132.

Figure 8:
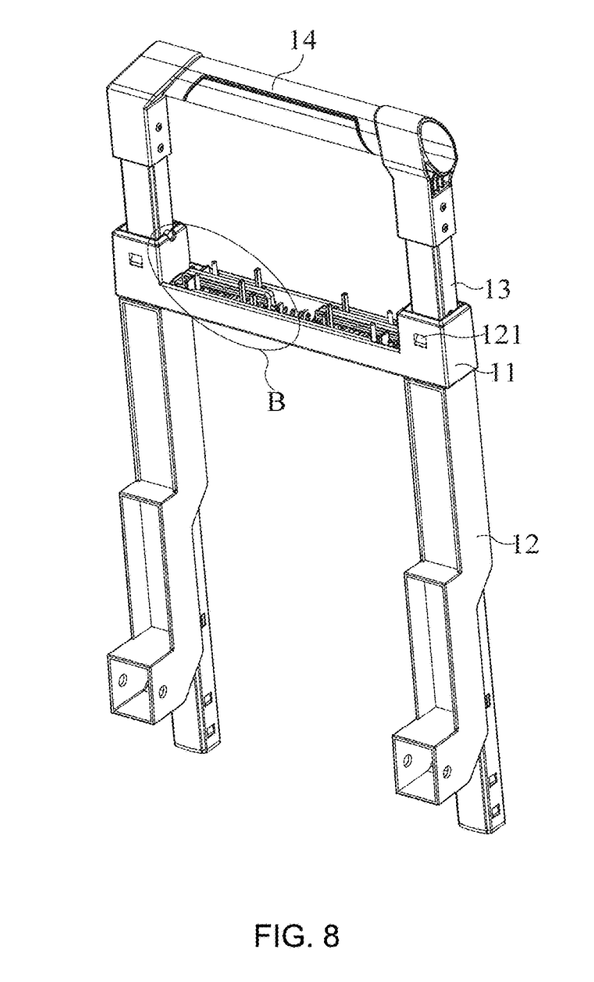
FIG. 8 is another schematic diagram of the structure of the retractable pull rod assembly.

Referring to the FIGS. 8-9, FIG. 8 is a schematic diagram of the structure of the retractable pull rod 13 assembly of the present application; FIG. 9 is an enlarged view of part B of the FIG. 8. In one embodiment, in conjunction with the FIG. 1, a horizontal guiding structure 6 is provided within the body of the horizontal rod 11. The horizontal guiding structure 6 can play a guiding role, which can limit the translational movement of the drive member 4 in the second direction, to prevent it from shifting and improve the smoothness of the translational movement of the drive member 4, and thus enhance the smoothness of the movement of the retractable pull rod assembly 100. The above horizontal guiding structure 6 can be any structure, as long as it can limit the translational movement of the drive member 4 in the second direction, and its specific structure is not limited.

Specifically, the horizontal guiding structure 6 includes a horizontal protruding part 61 and a horizontal guiding groove 62, and the horizontal protruding part 61 and the horizontal guiding groove 62 cooperate with each other to provide a guiding effect for the drive member 4 to move in the second direction. The horizontal protruding part 61 and the horizontal guide groove 62 cooperate with each other to provide guidance for the drive member 4 to move in the second direction.

As in one specific embodiment, the horizontal protruding part 61 is formed on the connecting columns 111 and the horizontal guide groove 62 is formed on the drive member 4. During translation of the drive member 4 relative to the horizontal rod 11, the horizontal protruding part 61 moves in the horizontal guide groove 62, thus preventing the drive member 4 from shifting when translating in the second direction. As in this example, when the drive member 4 is a driving block 41, both driving blocks 41 are symmetrically provided with horizontal guide grooves 62 on the surface of both ends in the second direction, and two sets of connecting columns 111 are symmetrically provided in the body of the horizontal rod 11, and the horizontal protruding parts 61 on the connecting columns 111 are accommodated in the horizontal guide grooves 62 to limit the translation of the two driving blocks 41 in the second direction.

As in a specific other embodiment, the horizontal protruding part 61 is formed on the drive member 4, and the horizontal guide groove 62 is provided in the connection column 111. During translation of the drive member 4 relative to the horizontal rod 11, the horizontal protruding part 61 slides in the horizontal guide groove 62 to limit the translation of the drive member 4 in the second direction and prevent it from shifting.

Referring to the FIGS. 1-3, in one embodiment, the elastic member 42 may be a spring with each end of the spring interconnected with the drive member 4. When the protruding part 411 of the drive member 4 is contracted inside the body of the horizontal rod 11, each of the two drive members 4 compresses the spring so that the spring is in a compressed state under force. When the protruding part 411 of the drive member 4 extends into the body of the horizontal rod, the spring returns to its original state.

Also, referring to the FIGS. 1, 5, and 8, the retractable pull rod assembly 100 further includes a handle 14, which is attached to the two pull rods 13 at an end away from the connecting rod 12. The handle 14 enables dragging and moving the toolbox, pulling out or retracting the pull rods 13, etc. Optionally, the handles 14 are attached to the ends of the pull rods 13 by rivets. Where the connecting rod 12 can be made of plastic or metal or alloy material, etc., without limitation here. The pull rod 13 can be made of metal or alloy material, etc., without limitation here. The above-mentioned connecting rod 12 as well as the pull rod 13 can be provided in the form of a tube.

In one embodiment, please refer back to the FIGS. 1, 5, and 8, one end of the connecting rod 12 is provided with a snap 121, a slot 114 is opened on the horizontal rod 11, and the slot 114 of the horizontal rod 11 and the snap 121 of the pull rod 13 are interlocked and cooperated to realize the connection between the horizontal rod 11 and the two connecting rods 12. In order to improve the stability between the horizontal rod 11 and the two connecting rods 12, the snap 121 is set as an inverted snap (not shown on the drawings), and the inverted snap end is set at an angle toward the bottom of the connecting rod 12, in which the inverted snap snaps into the slot 114 to reduce the risk of the horizontal rod 11 coming out, thus improving the stability of the connection between the horizontal rod 11 and the two connecting rods 12.

In one embodiment, please refer back to the FIGS. 3, 8, and 9, a limit column 131 is provided inside the pull rod 13, the end of the limit column 131 protrudes from the pull rod 13 near the horizontal rod 11, the horizontal rod 11 is provided with a limit slot 113, and the limit column 131 cooperates with the limit slot 113 to limit the pull rod 13 and prevent the pull rod 13 from extending excessively. The above limit column 131 can be integrally molded with the pull rod 13, or the limit column 131 can be attached to the pull rod 13, without limitation herein.

Compared with the prior art, in this embodiment of the retractable pull rod assembly 100, the button member 3, gear member 5 and drive member 4 are connected to each other by transmission, and the button member 3 can drive the drive member 4 to shrink in the body of the horizontal rod 11 through the gear member 5; the two ends of the elastic member 42 are connected to the drive member 4, and the drive member 4 can automatically return through the elastic member 42, so that the connecting rod 12 and the pull rod 13 can unlock and lock to each other. Through the above-mentioned way, it not only realizes the unlocking and locking of the pull rod 13 with simple structure, but also makes the unlocking and locking process of the pull rod 13 smoother, enhances the smoothness of the retractable pull rod assembly 100, and greatly improves the user's hand feeling.

In one embodiment, the toolbox includes a toolbox body and a retractable trolley assembly, and the retractable trolley assembly is provided on the toolbox body, which makes the toolbox more convenient to use and thus enhances the feeling of using the toolbox. It should be noted that the retractable trolley assembly in this embodiment is the retractable trolley assembly described in the above embodiment, and will not be repeated here.

Referring to the FIG. 10, the FIG. 10 is a schematic diagram of the structure of the horizontal rod body 116 of the present application. In an embodiment, the horizontal rod body 116 includes, horizontal rod 11, a button member 3, a drive member 4, a gear member 5, an elastic member 42, and a cover plate 8. The button member 3, the drive member 4 and the gear member 5 are connected to each other by transmission. If the button member 3 can drive the drive member 4 to shrink in the horizontal rod body 116 through the gear member 5, the two ends of the elastic member 42 are connected with the drive member 4, and the drive member 4 can automatically return to the position through the elastic member 42. In the above way, the horizontal rod 11 can be unlocked or locked in external tool equipment, such as a tool cart.

The number of horizontal rods 11 can be one, two or more. When the horizontal rod 11 is applied to the tool cart, the horizontal rod 11 can be provided with a shelf plate, etc., which can be unlocked or locked to the tool cart by the structure of the horizontal rod 11 itself, so that the position of the shelf plate can be adjusted, etc. Of course, the horizontal rod 11 can also be used in other equipment, here not to limit.

The above is only an implementation of this application, and is not intended to limit the scope of this application. Any equivalent structure or equivalent process transformation using the contents of this application and the accompanying drawings, or any direct or indirect application in other related technical fields, is included in the scope of patent protection of this application.

The following numbers correspond to the drawings:

| | |
|---|---|
| 11, horizontal rod; | 116, horizontal rod body; |
| 111, connecting column; | 12, connecting rod; |
| 112, guiding column; | 121, snap; |
| 113, limit slot; | 122, connecting rod notch; |
| 114, slot; | 13, pull rod; |
| 115, horizontal rod notch; | 131, limit column; |
| 132, pull rod notch; | 51, drive gear; |
| 14, handle; | 6, horizontal guiding structure; |
| 3, button member; | 61, horizontal protruding part; |
| 31, button rack; | 62, horizontal guiding groove; |
| 4, drive member; | 7, vertical guiding structure; |
| 41, drive block; | 72, vertical guiding groove; |
| 411, protruding part; | 8, cover plate; |
| 412, drive rack; | 81, limiting bar; |
| 413, limit part; | 82, screw posts |
| 42, elastic member; | 100, retractable pull rod assembly |
| 5, gear member; | |

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A retractable pull rod assembly, comprising:
   two connecting rods;
   two connecting pull rods that can be relatively retracted within the two connecting rods;
   a horizontal bar body combined to the two connecting rods comprising a horizontal rod that is fixed between the two connecting rods, a button member that moves in a first direction with respect to the horizontal rod, a gear member engaged to the button member to drive a drive member to an unlocked position and unlock the two connecting pull rods with respect to the two connecting rods, wherein the gear member is a drive gear disposed between the button member and the drive member and mutually gear-engaged with said button member and the drive member.

2. The retractable pull rod assembly of claim 1, and further comprising an elastic member biased against the drive member to automatically return the drive member to the locked position.

3. The retractable pull rod assembly of claim 1, and further comprising:
   a button rack extending vertically on each side of the button member;
   wherein the gear member is a pair of drive gears each one of which is engaged by a corresponding button rack at each side of the button member.

4. The retractable pull rod assembly of claim 1, wherein the drive member comprises of a driving block comprising:
   a drive rack on an underside of the driving block to engage the drive gear;
   a protruding part that protrudes from the horizontal bar body in the locked position; and
   a limit part on the driving block to limit movement of the protruding part.

5. The retractable pull rod assembly of claim 4, wherein the driving block further comprises of a horizontal guiding structure, and the horizontal rod further comprises of a connecting column with a horizontal protruding part engaged in the horizontal guiding structure.

6. The retractable pull rod assembly of claim 1, wherein the two connecting rods each further comprise a connecting rod notch, and wherein the two pull rods further comprise a pull rod notch, and wherein the horizontal bar body further comprises a horizontal rod notch; wherein the drive member further comprises a protruding part, wherein when the protruding part is contracted within said horizontal bar body in the unlocked position so that the two pull rods can move with respect to the two connecting rods; and wherein when the protruding part extends from the horizontal bar body and the horizontal rod notch, the pull rod notch are aligned the two pull rods are locked with respect to the two connecting rods.

7. The retractable pull rod assembly of claim 6, wherein the two connecting rods are provided with a snap at one end and the horizontal rod is provided with a slot so that the snap is snap-fitted into said slot, and wherein the connecting rod is provided with a limit slot and a limit column that fits into the limit slot to prevent the two pull rods from being removed from the two connecting rods.

8. The retractable pull rod assembly of claim 1, and further comprising a toolbox fixed to the two connecting rods.

9. The retractable pull rod assembly of claim 1, further comprising an elastic member offset below the button member to automatically return the pair of drive members to the locked position.

10. A retractable pull rod assembly, comprising:
    two connecting rods;
    two connecting pull rods that can be relatively retracted within the two connecting rods;
    a horizontal bar body combined to the two connecting rods comprising a horizontal rod that is fixed between the two connecting rods, a button member that moves in a first direction with respect to the horizontal rod, a gear member engaged to the button member to drive a drive member to an unlocked position and unlock the two connecting pull rods with respect to the two connecting rods, an elastic member biased against the drive member to automatically return the drive member to the locked position, and a pair of drive members extending away from each other with the elastic member biased between the pair of drive members to automatically return the pair of drive members to the locked position.

11. The retractable pull rod assembly of claim 10, wherein the button member, the gear member and the pair of drive members being mutually drive connected, wherein the button member being able to drive the pair of drive members to contract within the horizontal bar body by means of the gear member, wherein the pair of drive members being automatically homing by the elastic member, wherein the button member being able to retract within said horizontal bar body by the gear member to drive the pair of drive members to contract in said horizontal bar body, and wherein the pair of drive members can be automatically homed by the elastic member, so that said connecting rod and said pull rod can be unlocked and locked with respect to each other.

12. The retractable pull rod assembly of claim 10, wherein the elastic member is a spring with each end of said spring being interconnected with the pair of driving members, wherein the spring being compressed by force when said pair of driving members is contracted within said horizontal bar body.

13. A retractable pull rod assembly, comprising:
two connecting rods;
two connecting pull rods that can be relatively retracted within the two connecting rods;
a horizontal bar body combined to the two connecting rods comprising a horizontal rod that is fixed between the two connecting rods, a button member that moves in a first direction with respect to the horizontal rod, a gear member engaged to the button member to drive a drive member to an unlocked position and unlock the two connecting pull rods with respect to the two connecting rods, and a vertical guiding structure inside the horizontal bar body, wherein the vertical guiding structure comprises of a cooperating vertical projection and a vertical guiding groove each one of which is on one of the button member and the horizontal rod.

14. The retractable pull rod assembly of claim 13, wherein the vertical projection is a guiding column formed on the horizontal rod and the vertical guide is a vertical guiding groove formed on the button member, and further comprising a limit bar on an underside of the button member to engage the horizontal rod to prevent the drive member from buckling during translation.

15. A toolbox comprising:
two connecting rods;
two connecting pull rods that can be relatively retracted within the corresponding two connecting rods; and
a horizontal bar body combined to the two connecting rods comprising a horizontal rod that is fixed between the two connecting rods, a button member that moves in a first direction with respect to the horizontal rod, a gear member engaged to the button member to drive a drive member between an unlocked position to unlock the two connecting pull rods with respect to the two connecting rods, an elastic member biased against the drive member to automatically return the drive member to the locked position, and a pair of drive members extending away from each other with the elastic member biased between the pair of drive members to automatically return the pair of drive members to the locked position.

16. The toolbox of claim 15, and further comprising:
a button rack at both ends of the button member;
wherein the gear member is a pair of drive gears each one of which is engaged by a corresponding button rack at one of the ends of the button member;
wherein the pair of drive members each comprises of a driving block comprising a drive rack on an underside of the driving block to engage the drive gear; and
wherein vertical movement of the button member causes the button rack at both ends of the button member to rotate the drive gears which causes horizontal movement of the pair of drive members.

17. The toolbox of claim 16, and further comprising an elastic member between the pair of drive members to return the pair of drive members to a home position.

18. The toolbox of claim 17, wherein the button member, the gear member and the pair of drive members being mutually drive connected, wherein the button member being able to drive the pair of drive members to contract within the horizontal bar body by means of the gear member, wherein the pair of drive members being automatically homing by the elastic member, wherein the button member being able to retract within said horizontal bar body by the gear member to drive the pair of drive members to contract in said horizontal bar body, and wherein the pair of drive members can be automatically homed by the elastic member, so that said connecting rod and said pull rod can be unlocked and locked with respect to each other.

* * * * *